US006948819B2

(12) United States Patent
Mann

(10) Patent No.: US 6,948,819 B2
(45) Date of Patent: Sep. 27, 2005

(54) THREE-DIMENSIONAL DISPLAY USING OPTICAL FIBERS OF DIFFERENT LENGTHS

(76) Inventor: Christopher Westlye Mann, 5526 Alameda Ave., Apt. 4, Richmond, CA (US) 94804

( * ) Notice: Subject to any disclaimer, the term of this patent is extended or adjusted under 35 U.S.C. 154(b) by 60 days.

(21) Appl. No.: 10/731,848

(22) Filed: Dec. 6, 2003

(65) Prior Publication Data

US 2005/0122479 A1 Jun. 9, 2005

(51) Int. Cl.$^7$ .......................... G03B 21/26; G06T 15/00
(52) U.S. Cl. ..................... 353/28; 353/29; 345/419; 345/418; 345/6; 359/443; 348/804
(58) Field of Search ................... 353/28, 29; 345/419, 345/418, 4–6; 359/443; 348/804, 805, 756

(56) References Cited

U.S. PATENT DOCUMENTS

| 3,555,349 A | * | 1/1971 | Munz ........................ 315/383 |
| 3,878,329 A | * | 4/1975 | Brown ....................... 348/51 |
| 6,005,608 A | * | 12/1999 | Chakrabarti ................ 348/46 |
| 6,040,807 A | * | 3/2000 | Hamagishi et al. .......... 345/6 |
| 6,128,132 A | * | 10/2000 | Wieland et al. ............. 359/463 |
| 6,157,402 A | * | 12/2000 | Torgeson .................... 348/59 |
| 6,377,229 B1 | * | 4/2002 | Sullivan ..................... 345/6 |
| 2002/0130820 A1 | * | 9/2002 | Sullivan ..................... 345/6 |

* cited by examiner

Primary Examiner—Tuyet Thi Vo

(57) ABSTRACT

A system for viewing 3-D images that comprises an image source (50), a computer (105) and a television screen (110). The television screen is divided into a plurality of sections (115–130), with each section displaying an image representative of a certain depth in the image, as provided by the computer. Image display elements comprising optical fiber bundles (200–215) or lamps, (e.g. 520) and leads (e.g. 540) convey individual depth images from the television screen to a plastic block (225) in which the fiber bundles terminate or the lamps are positioned. The individual fiber bundles terminate at predetermined depths within the plastic block, with those conveying the nearest part of an image terminating at the front of the block, as viewed by an observer (220). The fiber bundle or lamp conveying the greatest depth in the image terminates near the rear portion of the block, as seen by an observer. Fiber bundles or lamps conveying images of intermediate distances terminate at intermediate distances within the block. Fiber diameters and lamp sizes graduate from large to small as depth in the image increases. A true 3-D image is thus provided.

24 Claims, 4 Drawing Sheets

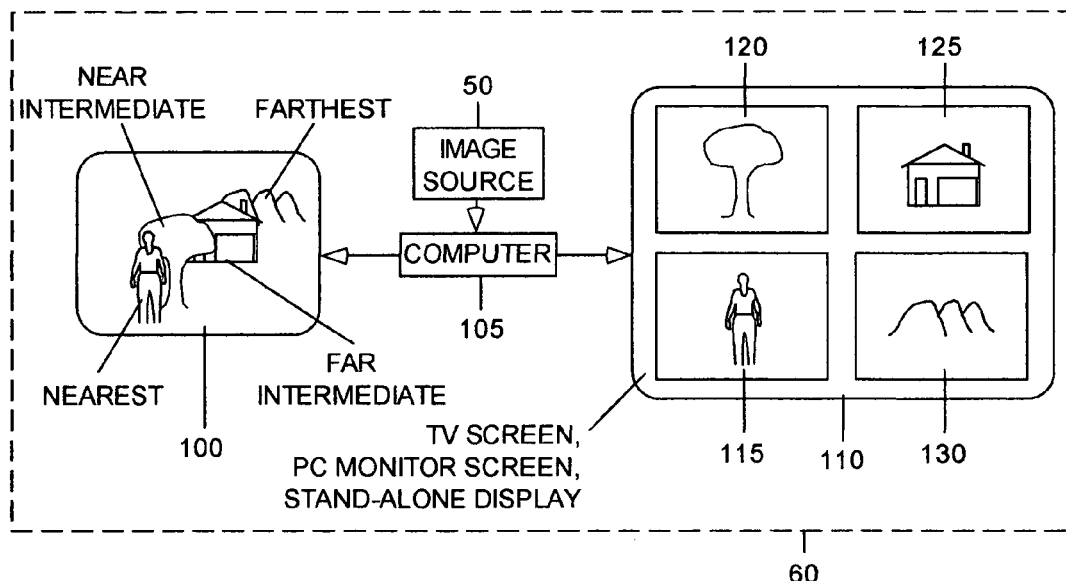
Fig. 1--Prior-Art
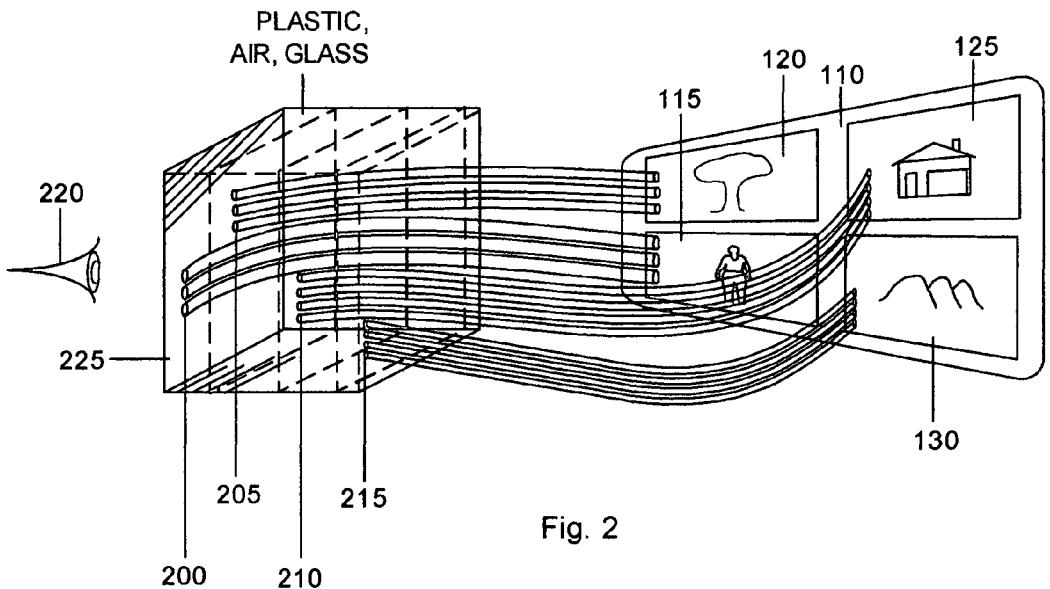
Fig. 2

THREE-DIMENSIONAL DISPLAY USING OPTICAL FIBERS OF DIFFERENT LENGTHS

FEDERALLY SPONSORED RESEARCH

NONE

SEQUENCE LISTING

NONE

BACKGROUND

1. Field of Invention

This invention relates generally to the display of television images, and in particular to the realistic simulation of three-dimensional images.

2. Prior-Art

Three-Dimensional Displays—Cathode Ray Tubes

After two-dimensional (2-D) television was invented by Philo T. Farnsworth in 1927 in San Francisco, Calif., U.S.A., subsequent developers have sought ways to provide three-dimensional (3-D) television. In U.S. Pat. No. 3,555,349 (1971), Muntz teaches a cathode ray tube (CRT) containing numerous, transparent imaging planes. Each plane comprises zones and individual phosphor picture elements which are addressed by an electron beam. Each plane is transparent to the electron beam and all planes are impinged simultaneously by it. However the elements of only a single plane fluorescence at a time. Fluorescence in all other planes is quenched by a radio frequency electric field. Thus a true 3-D image is presented to the viewer.

In U.S. Pat. No. 3,878,329 (1975), Brown teaches a cathode ray orthoscopic image tube. This tube comprises a wide-beam electron gun, magnetic horizontal and vertical deflection apparatus adapted for digital control, an electromagnetic dynamic electron beam focusing arrangement, a phosphor layer, an aperture lens array, a fiber optic face plate and a fly's eye lens array. Brown's apparatus presents a simulated 3-D image to the viewer.

While both Muntz and Brown can provide a 3-D image, they used custom-designed CRTs that required extraordinary care and precision in manufacture, are complex and expensive to make, are fragile, and require complex electronic circuitry in order to function as taught. In addition, since Brown displays all parts of the image at the same depth, the viewer does not see a true 3-D image.

Cathode Ray Tube Combined with External Apparatus

In U.S. Pat. No. 6,005,608 (1999), Chakrabarti teaches a true 3-D display apparatus for use without special 3-D glasses. The apparatus includes an ordinary CRT, a screen, a screen moving assembly, an imaging system, a focusing system, and a control system for receiving a signal representative of a 3-D image and separating the signal into a series of two-dimensional (2-D) representations.

In use, the control system causes the CRT to present a focused, first 2-D image to the screen, moves the screen to a second position, causes the CRT to present a focused, second 2-D image to the screen, and so forth until all 2-D representations of the 3-D image have been shown. The process then repeats.

While this apparatus presents a true 3-D image to the viewer, its mechanical nature imposes a speed-size trade-off, i.e., while a relatively small system could conceivably operate at standard video rates, a relatively large system would require a great deal of mechanical effort to produce 3-D images at a 25–30 Hz rate, as required to prevent flicker when seen by the human eye. Further, the belts, pulleys, and motor of the apparatus add significant cost and would likely require frequent maintenance. While this system displays portions of the image at different depths, it is not static and requires a prohibitively expensive and awkward mechanical arrangement.

Multi-Planar Volumetric Display System

A variation on the above system is taught by Sullivan in published U.S. patent application U.S. 2002/0130820. Instead of projecting a series of sections of a 3-D images on a mechanically moving screen, Sullivan employs a series of fixed-position liquid crystal screens oriented parallel to one-another and spaced by a predetermined amount. Each screen is either transparent or translucent. A controller coordinates 2-D image slices projected by a projector through the series of screens. A first, most distant image section is projected and the screen nearest the projector is rendered translucent, while the remaining screens are rendered transparent. Next, a second, next-most-distant image section is projected, and the screen nearest the projector is rendered transparent, the second-nearest screen is rendered translucent, and all remaining screens are transparent. This sequence continues until all sections of the image have been displayed, whereupon it repeats. Various other embodiments employ this basic component of the system.

While this system displays a true 3-D rendering of an image, it is relatively expensive, and requires sequential display of different-depth images.

Flat Panel Liquid Crystal Displays

In U.S. Pat. No. 6,040,807 (2000), Hamagishi et al. teach a 3-D liquid crystal display (LCD) comprising a flat light source, a vertical striped filter having slits, barriers for screening light from the light source, and a transmission-type display panel having left eye and right eye pixels formed alternately within. Hamagishi's device presents a simulated 3-D image to the viewer. Different parts of the image are displayed at the same depth.

While this arrangement of elements produces a 3-D image, it employs a technology and structure which are costly to prepare, less adaptable to various light sources, and do not present a true 3-D image.

Viewscreen Add-On for Various Display Types

In U.S. Pat. No. 6,157,402 (2000), Torgeson teaches a screen assembly for producing stereoscopic television (TV) images. His screen can be used with a projection LCD, plasma, and other kinds of displays that produce video pictures by scanning techniques. The TV image source image is applied to the back side of the screen assembly, and is viewed from the front side. Different parts of the image are displayed at the same depth.

As with Hamagishi's system, this arrangement of elements does produce a 3-D image. However it employs a technology and structure which are again costly to prepare, less adaptable to various light sources, and does not present a true 3-D image.

Fiber Optic Add-On for Video Projectors

In U.S. Pat. No. 6,128,132 (2000), Wieland et al, teach a 3-D viewing system comprising one or more light sources generating at least two views of an image, a slit-type barrier screen, at least one light-transmitting element coupled to the barrier screen, and a signal generator. The preferred light transmitting element is a fiber optic array.

In this apparatus, light is conveyed from a projector to one end of a fiber optic element array. At the other end of the fiber optic array, light from the fiber optic elements terminates on a single, planar screen containing slits which separate the right eye and left eye views.

This system produces a simulated 3-D image since the image is displayed on a 2-D screen surface. All parts of the image are displayed at the same depth.

Objects and Advantages

Accordingly, one object and advantage of the present invention is to provide an improved method and apparatus for presentation and viewing of 3-D television images. Other objects and advantages are to provide an inexpensive and simple means for obtaining 3-D image information from an ordinary TV display, which has no moving parts, can be made in any size, provides a true 3-D image by displaying parts of the image at different depths, does not require special viewing glasses, and is rugged.

Additional objects and advantages will become apparent from a consideration of the drawings and ensuing description.

Separation of Images According to Depth—FIG. 1

FIG. 1 shows a prior-art 3-D system 60. Images from an image source 50 are supplied in individual planes which are sorted according to depth. These images can be computerized animations, drawings with elements separated in planes according to depth, overlaid photographs of objects taken at different depths, and the like. For example, in the case of computerized animations, a character moves from far to near by appearing in successive planes, with each plane nearer to the viewer. These planes are uniquely identified by computer coding and supplied to a computer 105. Such a sorted image is known in the animation art and in other arts. Computer 105 can create the illusion of depth on a prior-art screen 100 by overlaying the images such that the nearer images lie on top of the farther images. Alternatively, computer 105 can cause individual planes to be displayed separately on a prior-art screen 110 as images 115–130.

Image source 50 can be a computer program. Computer software, such as sold under the mark "Canvas" by ACD Systems of Victoria, British Columbia, permits placement of objects according to their perceived depth. Individual layers of objects are superimposed in a 2-D view, such as shown on screen 100. Objects are thus represented in groups as shown in screen 100, with the nearest object obscuring the next-nearest, and so forth. Objects can also be shown individually according to their true depth, as shown in screen 110 by simply arraying individual layers across screen 110. In this example, screen 110 is divided into sections, with section 115 displaying the nearest objects, section 120 displaying near-intermediate distance objects, section 125 displaying far-intermediate distance objects, and section 130 displaying the farthest objects. More or fewer sections can be used, as required.

Another such program is sold under the mark "Director" by Macromedia, Inc. of San Francisco, Calif., U.S.A. The language used in this program is called "LINGO". This program permits images on a PC monitor to be divided into four sections, with each section associated with a predetermined depth in an image.

SUMMARY

In accordance with the present invention, a method and apparatus convert image data from a 2-D image source and displays it in a 3-D format. The image source provides a plurality of components of a scene, with the components separated by depth within the scene. The depth components are first displayed separately on a screen where their images are coupled to one end of at least two fiber optic bundles. The bundles are interspersed in a parallel arrangement so that the components of the image remain in registration. Finally, the other ends of the bundles are fixed in a transparent block with the ends of the fibers containing the near portion of the image located closest to the viewer. The ends of the fibers containing the farthest portion of the image are located farthest from the viewer within the block. Intermediate distance fiber ends are located between the two extremes. The fiber diameters are also graded such that the nearest portion of the image is carried by the largest diameter fibers, the farthest portion of the image carried by the smallest fibers, and intermediate portions carried by intermediate sized fibers. The result is a true 3-D image.

DRAWINGS—FIGURES

FIG. 1 is a diagram of a prior-art system for separating image components according to their distance from the observer.

FIG. 2 is a diagrammatic view of a preferred embodiment of a 3-D display system according to the present invention.

DRAWINGS—REFERENCE NUMERALS

| | |
|---|---|
| 50 | Image source |
| 50' | Image source |
| 60 | Prior-art 3-D system |
| 100 | Screen |
| 105 | Computer |
| 105' | Computer |
| 110 | Screen |
| 115 | Section of Screen |
| 120 | Section of Screen |
| 125 | Section of Screen |
| 130 | Section of Screen |
| 200 | Fiber bundle |
| 205 | Fiber bundle |
| 210 | Fiber bundle |
| 215 | Fiber bundle |
| 220 | Observer |
| 225 | Block |
| 225' | Block |
| 300 | Projector |
| 305 | Projector |
| 310 | Projector |
| 315 | Projector |
| 500 | Memory location |
| 505 | Memory location |
| 510 | Memory location |
| 515 | Memory location |
| 520 | Light source group |
| 525 | Light source group |
| 530 | Light source group |
| 535 | Light source group |
| 540 | Conductors |
| 545 | Conductors |
| 550 | Conductors |
| 555 | Conductors |

DETAILED DESCRIPTION

Figure 3:
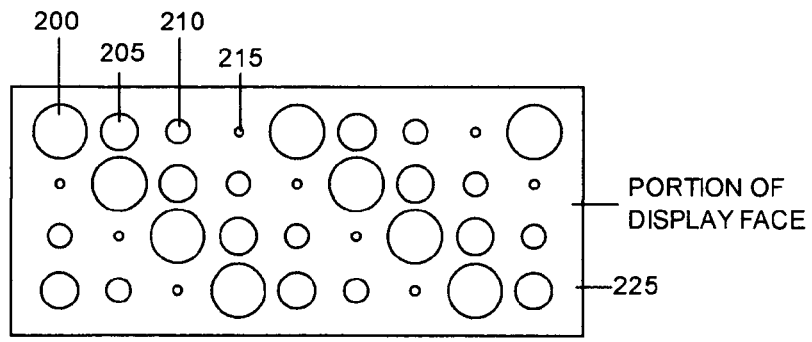
FIG. 3 is a front view of a portion of the 3-D display screen.
Figure 4:
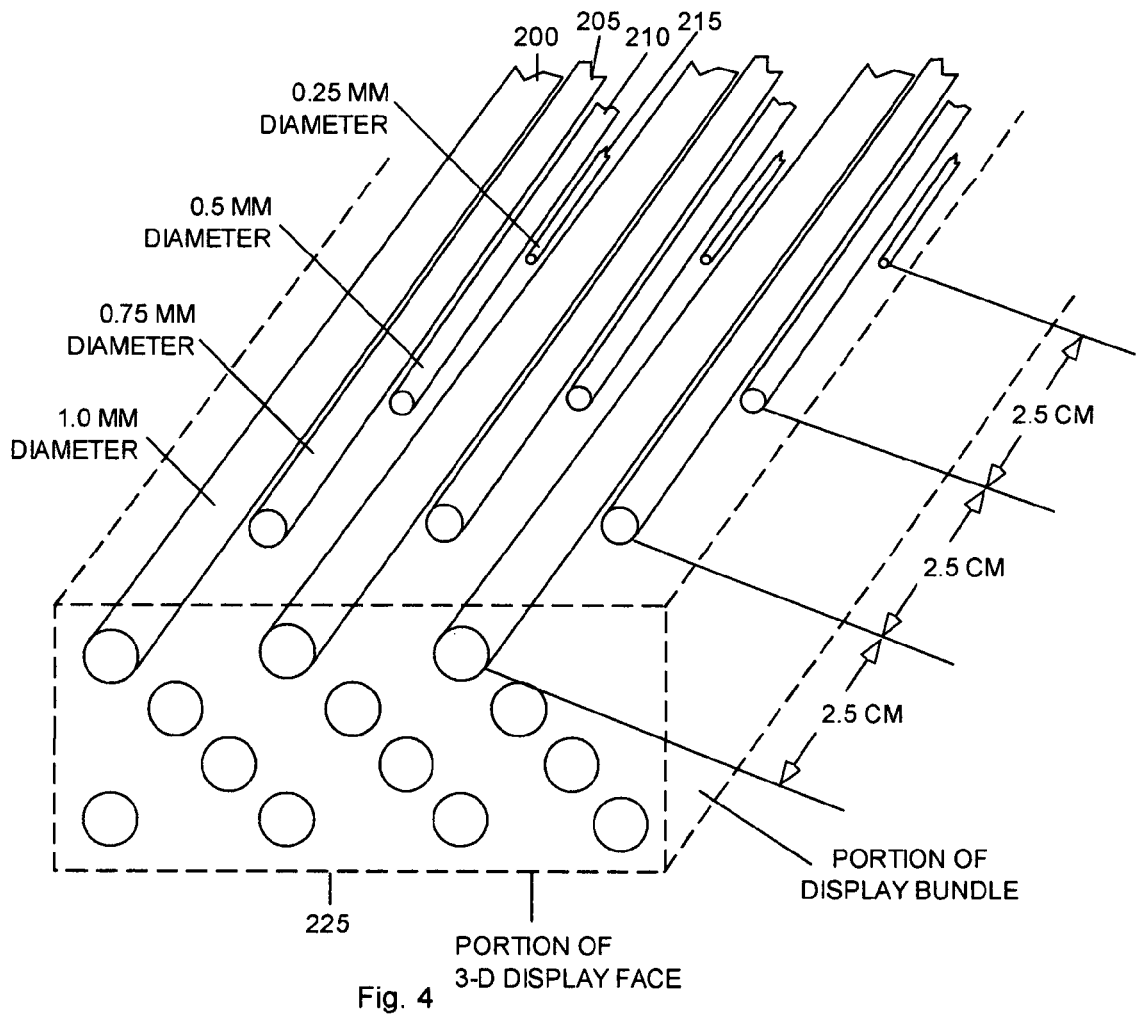
FIG. 4 is a perspective cut-away view of a portion of the 3-D display screen.

Preferred Embodiment—FIGS. 2–4

FIG. 2 shows a preferred embodiment of a 3-D display according to the present invention. Screen 110 preferably is the television screen of FIG. 1, but can be a personal-computer (PC) monitor, or a stand-alone display. Screen 110 is flat and is divided electronically into four sections which are arranged to display areas of a scene having increasing depths, as described above in connection with FIG. 1. A first section 115 displays a portion of the image containing objects nearest to the observer, such as a human. A second section 120 displays a portion of the image located in the near-intermediate distance range, such as a tree. A third section 125 displays a portion of the scene in the far-intermediate distance range, such as a house. Finally a fourth section 130 displays a portion of a scene farthest away from the observer, such as a mountain.

Four fiber optic bundles 200–215 are located so that each bundle is illuminated by a respective one of sections 115–130 of screen 110. Only a few fibers are shown in each bundle for clarity. However the number of fibers leading to each section of screen is sufficient to fully cover its associated fiber bundle.

The right or rear ends of bundles 200–215 terminate at their respective positions on the portions of screen 110. These fiber bundles can be held in place on the screen by various materials, including adhesives, rubber, glass, plastic, and the like. The other or forward ends of bundles 200–215 terminate in a block 225. They are interspersed as shown in FIG. 3. Block 225 can be made of a clear plastic material or glass, or can even represent a volume of air.

The ends of bundle 200 terminate in a plane within block 225 which is nearest to viewer 220. The ends of bundle 205 terminate in a plane within block 225 which is farther from viewer 220. The ends of bundle 210 terminate in a plane within block 225 which is still farther from viewer 220, and the ends of bundle 215 terminate in a plane within block 225 which is farthest from viewer 220. The distances between planes are preferably 2.5 cm.

The fibers comprising each of bundles 200–215 preferably are of different diameters. Those in bundle 200 are preferably 1 mm in diameter, those in bundle 205 are 0.75 mm in diameter, those in bundle 210 are 0.5 mm in diameter, and those in bundle 215 are 0.25 mm in diameter. Thus the fibers which are associated with near objects are the largest, while those associated with increasing distances from viewer 220 are of decreasing diameters.

The fibers in each of bundles 200–215 may be of any convenient length, preferably about 60 cm (nominal), but may be longer (e.g., 100 cm) or shorter. Each bundle is of different length by 2.5 cm so that bundles which originate at screen 110 will have the correct spacing at viewing block 225.

The ends of fiber bundles 200–215 which are proximate to screen 110 are polished and coupled to screen 110 in such a manner as to maximize light transfer from screen 110 to all individual fibers. The ends of fiber bundles 200–215 which terminate within block 225 preferably are polished, but may be given a matte surface. In any case, they are treated in such a way as to maximize light output for observation by viewer 220.

Bundles 200–215 are fixed or "coherent", i.e. the fibers in each bundle retain their relative positions to one-another at each end of the bundle. E.g., the fiber in bundle 200 at the top left of screen section 115 is also at the top left of its respective plane within block 225.

Although not illustrated in FIG. 2 for ease of illustration, the fibers in bundles 200–215 are interspersed as shown in FIGS. 3 and 4. Thus the forward ends of the fibers from each of portions 115–130 of screen 110 extend over its entire plane of block 225 to form four properly registered images which cooperate to form a complete, properly registered 3-D image when viewed in block 225. Thus when observer 220 views block 225 (FIG. 3) they will see the ends of all four bundles 200–215 interspersed.

Although screen 110 is divided into four interspersed sections for descriptive purposes, more or fewer sections can be employed. In any case, an equal number of bundles and planes would be utilized.

Bundles 200–215 can be assembled in block 225 by using a mesh screen (not shown), such as window screening, and insert each 1 mm fiber in bundle 200 into every other square. The ends of all fibers are stopped in the same plane by a level, flat surface which is larger than block 225. The fibers in bundle 200 are then cast in clear plastic resin. The resin is poured to a depth equal to the desired axial spacing between bundles. When the resin hardens, the fibers in bundle 205 are then spaced using another, identical mesh screen.

The fibers in bundle 205 are located one position away from the fibers in the first screen so that they are interspersed between the fibers in bundle 200. The fibers in bundle 205 are next secured by casting in clear plastic resin, poured to the proper depth for spacing of the viewing planes. This process continues until all fibers are cast in place in block 225.

The other ends of bundles 200–215 are similarly secured, except their ends are placed into every adjacent square of a mesh screen.

The fibers in bundles 200–215 are kept in registration so that the images in screen 110 are interspersed for correct viewing in block 225.

The spacing and depth of the fibers in bundles 200–215 can also be fixed by weaving threads around the individual optical fibers in a loom (not shown) so that the depths within block 225 are akin to a hem in a fabric. Bundles 200–215 are then assembled in layers and are fixed in place by plastic resin poured from the sides of the fibers.

Operation

Preferred Embodiment—FIGS. 2–4

In operation, computer 105 (FIG. 1) causes screen 110 to display images 115–130 which display different parts of a scene according to their distance from the viewer. The nearest part or image 115 (the person) is conveyed via the large-diameter fibers in bundle 200 to a first plane at the front of block 225 nearest viewer 220. The next-nearest image 120 (the tree) is conveyed via smaller-diameter fibers in bundle 205 to a second plane slightly farther from viewer 220; the next image 125 (the house) is conveyed via still smaller-diameter fibers in bundle 210 to a third plane still farther away from viewer 220, and the farthest image 130 (the mountain) is conveyed via the smallest-diameter fibers in bundle 215 to a fourth plane, the farthest from viewer 220. The fibers of each image extend over the entire area of its plane in block 225 but the ends of each bundle occupy an exclusive area of all planes so that the ends of all fibers in all four bundles can be seen at once by observer 220. The number of fibers in each bundle are numerous enough so that, although its image is interspersed with three other images, its image will still appear coherent.

Thus viewer 220 perceives a true 3-D image with near objects conveyed by the largest of fibers in bundle 200, and farther objects conveyed by successively smaller and more distant fibers in bundles 205, 210, and 215.

Larger fibers are used for portions of the image closer to the observer in order to emphasize objects near to the observer. Smaller fibers are used for portions of the image farther away from the observer in order to de-emphasize them. I.e., the viewer will see a scene in which the person will appear to be close, the tree will be less close, the house farther, and the mountain farthest away. The scene will be a realistic 3-D scene, conveying the perception of depth as would be seen in a real-life situation. The view is realistic because its actual parts are physically at different distances from the viewer.

In other words the viewer will see four combined images on face 225. The first or closest image will be an image of the person formed by the ends of the fibers of bundle 200 in a plane closest to the observer, such that the person will actually be physically closest to the observer and will so appear. As stated, even though the ends of the fibers in bundle 200 are separated in their plane to allow the observer to see the ends of the other three bundles, the image of the person will appear to be coherent because a large number of fibers are used in each bundle and these are closely spaced. E.g., for a 50 cm (diagonal) faceplate 225 with four bundles of fibers, each bundle preferably has 465,000 fibers yielding a final image resolution of 39 picture elements per cm, assuming that the viewing screen is the same size as each of the four screen areas 115–130.

Description and Operation

Figure 5:
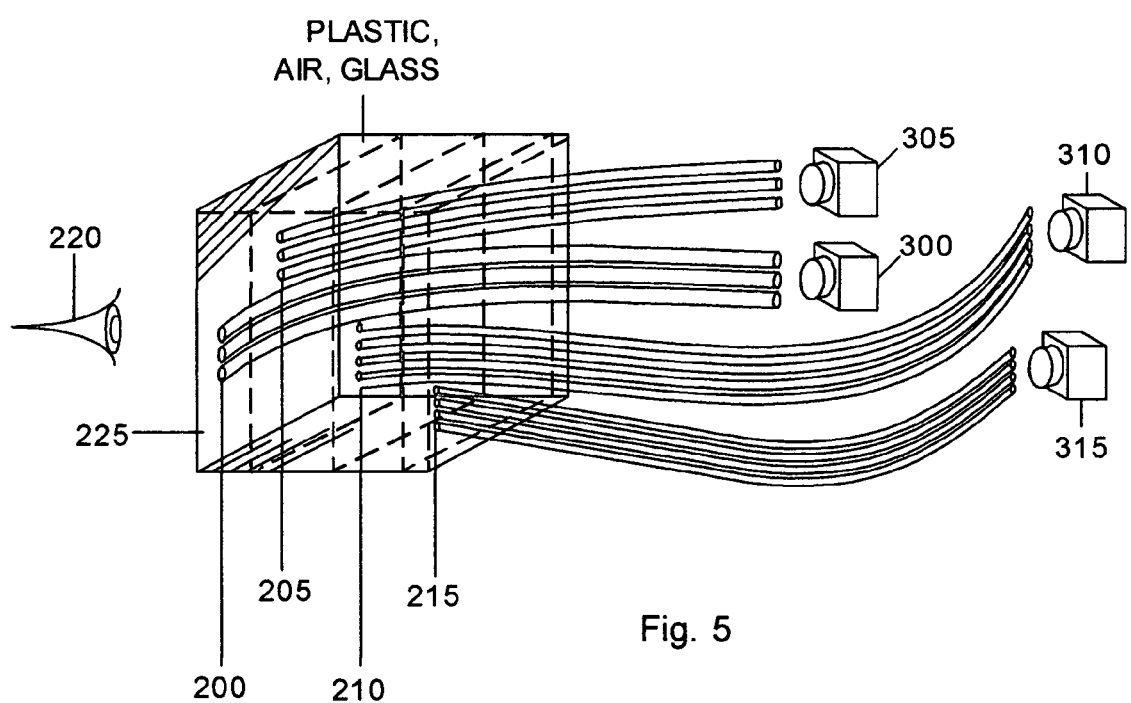
FIG. 5 is a diagrammatic view of an alternative embodiment according to the present invention.

First Alternative Embodiment—FIG. 5

FIG. 5 shows a first alternative embodiment in which sections 115–130 of screen 110 (FIGS. 1 and 2) can be replaced by other image sources such as projectors 300–315. Projectors 300–315 individually serve the same function as screen sections 120–130. They illuminate the ends of fiber bundles 200–215 with image sections which are separated in depth. Each projector is arranged to display a part of a scene at a different depth. Thus projector 300 projects the nearest portions of an image, projector 305 projects the next-nearest, and so forth.

The images supplied to each of projectors 300–315 arise from the operation of image source 50, which may be a computer program, previously stored photographic images, or the like.

Description

Figure 6:
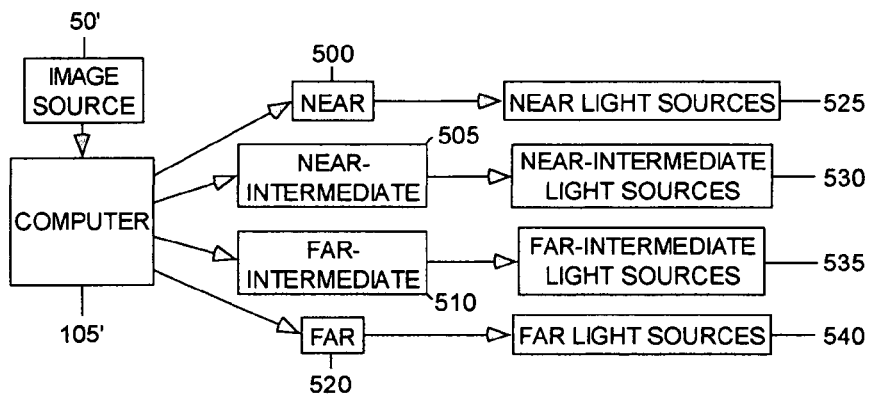
FIG. 6 is a block diagram of a second alternative embodiment according to the present invention.
Figure 7:
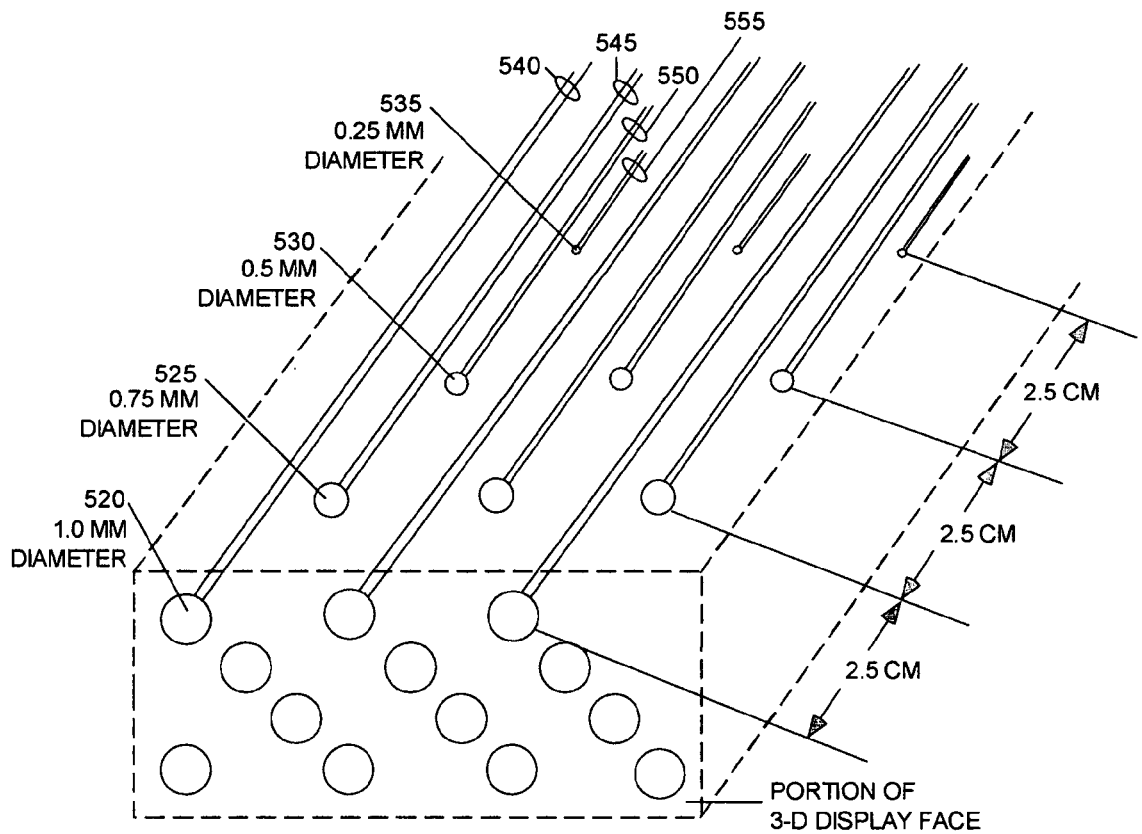
FIG. 7 is a perspective cut-away view of a portion of a 3-D display screen according to the second alternative embodiment of FIG. 6.

Second Alternative Embodiment—FIGS. 6 and 7

Instead of using fiber optics as described above, a 3-D display according to the invention can be realized in an all-electronic, alternative embodiment is shown in FIGS. 6 and 7. An image source 50' (FIG. 6), similar to that discussed above in connection with FIG. 1, is connected to a computer 105', similar in capability with that shown in FIG. 1. In the present embodiment, computer 105' stores the four image components (near, near-intermediate, far-intermediate, and far) in memory locations 500, 505, 510, and 515, respectively. In turn, groups of light sources 520, 525, 530, and 535, display image components near, near-intermediate, far-intermediate, and far in separated respective planes as shown in FIG. 7. Each set of light sources is positioned in its respective plane, similar to the manner in which the forward ends of the optical fibers are positioned in FIGS. 2 and 4. Only a few light sources are shown in each group for clarity. However each section of screen is fully covered by its associated light source group.

Signals from memory locations 500–515 are conveyed to light sources 520–535 through the usual electronic multiplexers and buffers (not shown), and conductors 540–555 respectively, in a fashion well-known to those skilled in the art of electronics.

Signals from memory locations 500–515 can be binary ON-OFF signals, or can be stored as bytes in order to provide variations in intensity as required by the image from source 50'.

Light sources 520–535 can comprise Light-Emitting Diodes (LEDs), incandescent bulbs, gaseous discharge bulbs and the like, and even mixtures of these types. Sources 520–535 are held in clear block 225' in respective planes, similar to block 225 (FIG. 2). Block 225' can be assembled as discussed above in connection with block 225.

Light sources 520–535 preferably also vary in size from near and large (520) to far and small (535). Alternatively, sources 520–535 can be made brighter for the nearer parts of the image and dimmer for far-away parts.

Operation

Second Alternative Embodiment

Image source 50' provides a spatially-separated image to computer 105' which in turn places near, near-intermediate, far-intermediate, and far portions of the image into memory locations 500–515. The values stored in locations 500–515 are representative of intensity levels required of each source in order to convey the image to light sources 520–535.

A binary ONE can be used to drive a light source to full intensity; a binary ZERO can be used to turn a light source off. Alternatively, gradations of light and dark can be provided by decoding bytes of data in memory and applying varying driving forces to the light sources, in well-known fashion.

The set of four images will be seen by the observer at different depths, similar to that of FIGS. 2 and 4, thereby presenting a true 3-D image.

CONCLUSION, RAMIFICATIONS, AND SCOPE

It is thus seen that the present system provides a novel method and apparatus for viewing true 3-D images. Images appear in the plastic block fiber terminus with the appearance of depth that they would have if viewed in real life. The image source can be a television screen divided into segments according to depth in the original image, a plurality of projectors, a plurality of illuminated images, and the like. Computer games, animations, real-life and still images can be appreciated in 3-D.

Instead of different diameter fibers, all four bundles can have fibers of the same diameter.

Instead of a flat viewing screen, the display can be manufactured with a convex or concave, curved face.

Instead of a single transparent viewing screen, the apparatus can be manufactured in segments and assembled in a large-scale array.

While the above description contains many specificities, these should not be considered limiting but merely exemplary. Many variations and ramifications are possible. For example instead of moving pictures, images can be static or slowly-changing. The screen or source can have fewer parts (two or three) or more than four parts. During viewing, depths of components of a scene can vary under the control of the image source and computer. The distances between fiber-end planes can be different in different apparatus, depending on the kinds of images to be displayed.

While the present system employs elements which are well known to those skilled in the art of generating 3-D images, it combines these elements in a novel way which produces a new result not heretofore discovered.

Accordingly the scope of this invention should be determined, not by the embodiments illustrated, but by the appended claims and their legal equivalents.

What is claimed is:

1. A system for presenting a realistic three-dimensional display, comprising:
    a source for providing a plurality of components of a scene, each component representing a portion of said scene at a different depth in said scene,
    a corresponding plurality of bundles of image display elements,
    each bundle of image display elements containing a multitude of image display elements,
    each image display element having an input and a display output,
    each bundle of image display elements corresponding to a respective component of said scene,
    said display output of each of said image display elements being arranged to display an element of the component of said scene represented by the bundle containing said image display element,
    said input of each image display element being arranged to receive display information representing an element of the component of said scene represented by the bundle containing said image display element,
    the display output of each image display element arranged to display said element of said component of said scene according to the information received by the input of said image display element, such that each bundle of image display elements will be able to display its respective component of said scene,
    a display end of each image display element being placed at a distance from an observer corresponding to the depth of the component in said scene represented by the bundle containing said image display element, such that said display outputs of said image display element of each bundle will be able to display its respective component of said scene at a distance corresponding to its depth in said scene,
    whereby the display outputs of said plurality image display elements will display a true three-dimensional image of said scene, with closer parts of said scene physically closer to said observer and more distant parts of said scene more distant from said observer.

2. The system of claim 1, wherein said display outputs of said image display elements are light sources and said inputs of said image display elements are respective leads for energizing said light sources.

3. The system of claim 1, further including a computer for generating said plurality of components of said scene and presenting each component visually in a different physical display area.

4. The system of claim 1, wherein said source is a single display screen divided into a corresponding plurality of display areas.

5. The system of claim 1, wherein said source is a plurality of separate displays.

6. The system of claim 1, wherein said source is a single display screen divided into a corresponding plurality of display areas, and wherein the fibers in each bundle have the same diameter and the fibers in each bundle have a different diameter than the fibers in the other bundles of said plurality of bundles.

7. The system of claim 6, wherein said display ends of the fibers in all of said plurality of bundles are interspersed when viewed by said observer.

8. The system of claim 1, wherein said image display elements are optical fibers and said input of each of said image display elements is one end of an optical fiber and said display output of each image display elements is an opposite end of each optical fiber.

9. The system of claim 8, wherein the fibers in each bundle have the same diameter and the fibers in each bundle have a different diameter than the fibers in the other bundles of said plurality of bundles.

10. The system of claim 8, wherein said display ends of the fibers in all of said plurality of bundles are interspersed when viewed by said observer.

11. The system of claim 8, wherein said display ends of the fibers in all of said plurality of bundles are mounted in a transparent block.

12. The system of claim 11, wherein said display ends of the fibers in each bundle is positioned in a respective plane in said block so that the ends of all fibers in all of said plurality of bundles are positioned in a corresponding plurality of planes in said block, each of said planes being positioned at a different distance from said observer.

13. A method for presenting a realistic three-dimensional display, comprising:
    providing a plurality of components of a scene, each component representing a portion of said image at a different depth in said scene, and each component being presented visually in a different physical display area,
    providing a corresponding plurality of fiber optic bundles, each bundle containing a multitude of optical fibers, each of said fiber optic bundles having a source end and a display end, the source end of each fiber optic bundle being placed adjacent to a respective display area of said source, such that each fiber optic bundle will convey a respective component of said image of a different depth in said scene,
    placing said display end of each fiber optic bundle at a distance from an observer corresponding to its depth in said scene, such that said display end of each fiber optic bundle will display a respective component of said image at a distance corresponding to its depth in said scene,
    whereby the display ends of said plurality of fiber optic bundles will display a true three-dimensional image of said scene, with closer parts of said scene physically closer to said observer and more distant parts of said scene more distant from said observer.

14. The system of claim 13, wherein said components of a scene are presented on a single display screen divided into a corresponding plurality of display areas.

15. The system of claim 13, wherein said components of a scene are presented on a plurality of separate displays.

16. The system of claim 13, wherein the fibers in each bundle have the same diameter and the fibers in each bundle have a different diameter than the fibers in the other bundles of said plurality of bundles.

17. The system of claim 13, wherein said display ends of the fibers in all of said plurality of bundles are interspersed when viewed by said observer.

18. The system of claim 13, further including providing a computer for generating said plurality of components of said scene and presenting each component visually in a different physical display area.

19. The system of claim 13, wherein said components of a scene are presented on a single display screen divided into a corresponding plurality of display areas, and wherein the fibers in each bundle have the same diameter and the fibers in each bundle have a different diameter than the fibers in the other bundles of said plurality of bundles.

20. The system of claim 19, wherein said display ends of the fibers in all of said plurality of bundles are interspersed when viewed by said observer.

21. The system of claim 13, wherein said display ends of the fibers in all of said plurality of bundles are mounted in a transparent block.

22. The system of claim 21, wherein said display ends of the fibers in each bundle are positioned in a respective plane in said block so that the ends of all fibers in all of said plurality of bundles are positioned in a corresponding plurality of planes in said block, each of said planes being positioned at a different distance form said observer.

23. A method for presenting a realistic three-dimensional display, comprising:

provinding a plurality of components of a scene, each component representing a portion of said image at a different depth in said scene, each component comprising a multitude of elements of said component, providing a corresponding plurality of bundles of light sources, each bundle containing a corresponding multitude of light sources, each of said light sources having a lead end and a display end, the lead end of each light source being arranged to receive information representing a respective element of said component of said scene, such that each light source will display an element of its component of said scene and each bundle of light sources will convey a respective component of said scene at a different depth in said scene, placing said display end of each light source at a distance from an observer corresponding to the depth of the component containing the element represented by said light source in said scene, such that said display end of each light source will display a respective element of said scene at a distance corresponding to its depth in said scene, whereby the display ends of said plurality of bundles or light sources will display a true three-dimensional image of said scene, with closer parts of said scene physically closer to said observer and more distant parts of said scene more distant from said observer.

24. The method of claim 23, wherein said light sources are light-emitting diodes.

* * * * *